US012559011B1

(12) United States Patent
  Taylor

(10) Patent No.: US 12,559,011 B1
(45) Date of Patent: Feb. 24, 2026

(54) SEAT OF A VEHICLE

(71) Applicant: FERRARI S.P.A., Modena (IT)

(72) Inventor: Daniel Martin Taylor, Modena (IT)

(73) Assignee: FERRARI S.P.A., Modena (IT)

( * ) Notice: Subject to any disclaimer, the term of this patent is extended or adjusted under 35 U.S.C. 154(b) by 0 days.

(21) Appl. No.: 18/977,085

(22) Filed: Dec. 11, 2024

(30) Foreign Application Priority Data

Dec. 12, 2023   (IT) ........................ 102023000026460

(51) Int. Cl.
  *B60N 2/882*    (2018.01)
  *B60N 2/72*    (2006.01)
  *B60R 25/04*    (2013.01)

(52) U.S. Cl.
  CPC .............. *B60N 2/882* (2018.02); *B60N 2/72* (2013.01); *B60R 25/04* (2013.01)

(58) Field of Classification Search
  CPC ........ B60N 2/882; B60N 2/72; B60N 2/7005; B60R 25/04
  USPC ........................................................ 180/287
  See application file for complete search history.

(56) References Cited

U.S. PATENT DOCUMENTS

| | | | | |
|---|---|---|---|---|
| 10,427,575 | B2 * | 10/2019 | Kondrad .................. | B60N 2/22 |
| 11,752,902 | B1 * | 9/2023 | Wittenschlaeger .... | B60N 2/002 |
| | | | | 297/284.9 |
| 2018/0186260 | A1 | 7/2018 | Kondrad et al. | |
| 2023/0373370 | A1 | 11/2023 | Grebovic | |
| 2025/0187507 | A1 * | 6/2025 | Taylor .................... | B60N 2/882 |
| 2025/0276627 | A1 * | 9/2025 | Radion .................. | B60N 2/882 |

FOREIGN PATENT DOCUMENTS

| | | | | |
|---|---|---|---|---|
| CN | 111994017 A | 11/2020 | | |
| CN | 215705859 U | * 2/2022 | | |
| DE | 102019125876 A1 | * 3/2020 | ............. | B60N 2/859 |
| EP | 3766733 A1 | 1/2021 | | |
| JP | 2002347487 A | * 12/2002 | | |

OTHER PUBLICATIONS

JP-2002347487-A Tsundoa English Translation from PE2E (Year: 2002).*
English Translation CN215705859 (Year: 2021).*
English Translation EP3766733 (Year: 2020).*
Italian Search Report and Written Opinion dated Jun. 27, 2024 for Italian Patent Application No. 202300026460 filed Dec. 12, 2023, 23 pages.

* cited by examiner

*Primary Examiner* — Paul N Dickson
*Assistant Examiner* — Caitlin Anne Miller
(74) *Attorney, Agent, or Firm* — CANTOR COLBURN LLP

(57) ABSTRACT

A seat of a vehicle having: a base structure, which is rigid and is configured to be fixed to a floorboard of the vehicle; and an upholstery, which is elastically deformable, at least partially covers the base structure and constitutes the outermost part of the seat that comes into contact with a body of a passenger of the seat. The upholstery has a cushion, a backrest and a headrest, which are separate from and independent of one another. The headrest of the upholstery is fixed to the base structure in a separable manner by means of a coupling system. The base structure has an upper portion, which is configured to support the headrest and, at the same time, is configured, in the absence of the headrest, to accommodate a helmet worn by the passenger sitting on the seat.

20 Claims, 11 Drawing Sheets

SEAT OF A VEHICLE

CROSS-REFERENCE TO RELATED APPLICATIONS

This patent application claims priority from Italian patent application no. 102023000026460 filed on Dec. 12, 2023, the entire disclosure of which is incorporated herein by reference.

TECHNICAL FIELD

This invention relates to a seat of a vehicle.

PRIOR ART

The seat of a vehicle consists of a cushion with an essentially horizontal configuration and a backrest with an essentially vertical configuration.

Seats are one of the vehicle elements that most influences passenger comfort as they are the interface through which passengers come into physical contact with the vehicle. Currently, seats are designed by looking for the best possible compromise to suit a wide range of passenger sizes and a wide range of driving conditions (e.g. for a long journey on roads open to the public, comfort should be favoured, while in performance driving on a circuit, lateral support should be favoured). As a result, seats allow almost all people to achieve a good (or in some cases acceptable) level of comfort in all driving conditions but hardly allow people to achieve a high level of comfort in all driving conditions.

Patent application EP3766733A1 describes an automobile seat comprising a structure with one or two composite structural shells and upholstery elements that can be removably attached to the surfaces of the structure. Male coupling elements are fixed at predetermined positions spaced apart on the structure and are equipped with a pin with an enlarged head. Each upholstery element comprises a spongy body and an insert of a rigid or semi-rigid consistency integral with the spongy body and provided with one or more through openings, into which respective female coupling elements are inserted each provided with a concave housing configured to engage and retain the enlarged head of a male coupling element in an elastically releasable manner.

Patent application US2018186260A1 describes a headrest assembly for a seat of a high performance vehicle comprising front and rear panels that are coupled to the front and rear sides of a support element and also coupled to each other. A headrest support is securely coupled to a front panel mounting surface. The headrest support is configured to be easily mounted and removed from the front panel mounting surface. When the headrest support is removed, a hollow is accessible and configured to receive the back of a vehicle occupant's helmet.

DESCRIPTION OF THE INVENTION

The purpose of this invention is to provide a vehicle seat that offers a high degree of comfort to all occupants and in all driving conditions.

According to this invention, a seat of a vehicle is provided as claimed by the attached claims.

The claims describe preferred embodiments of this invention forming an integral part of the present specification.

BRIEF DESCRIPTION OF THE DRAWINGS

This invention will now be described with reference to the accompanying drawings, which illustrate some non-limiting embodiments thereof, in which.

PREFERRED EMBODIMENTS OF THE INVENTION

Figure 1:
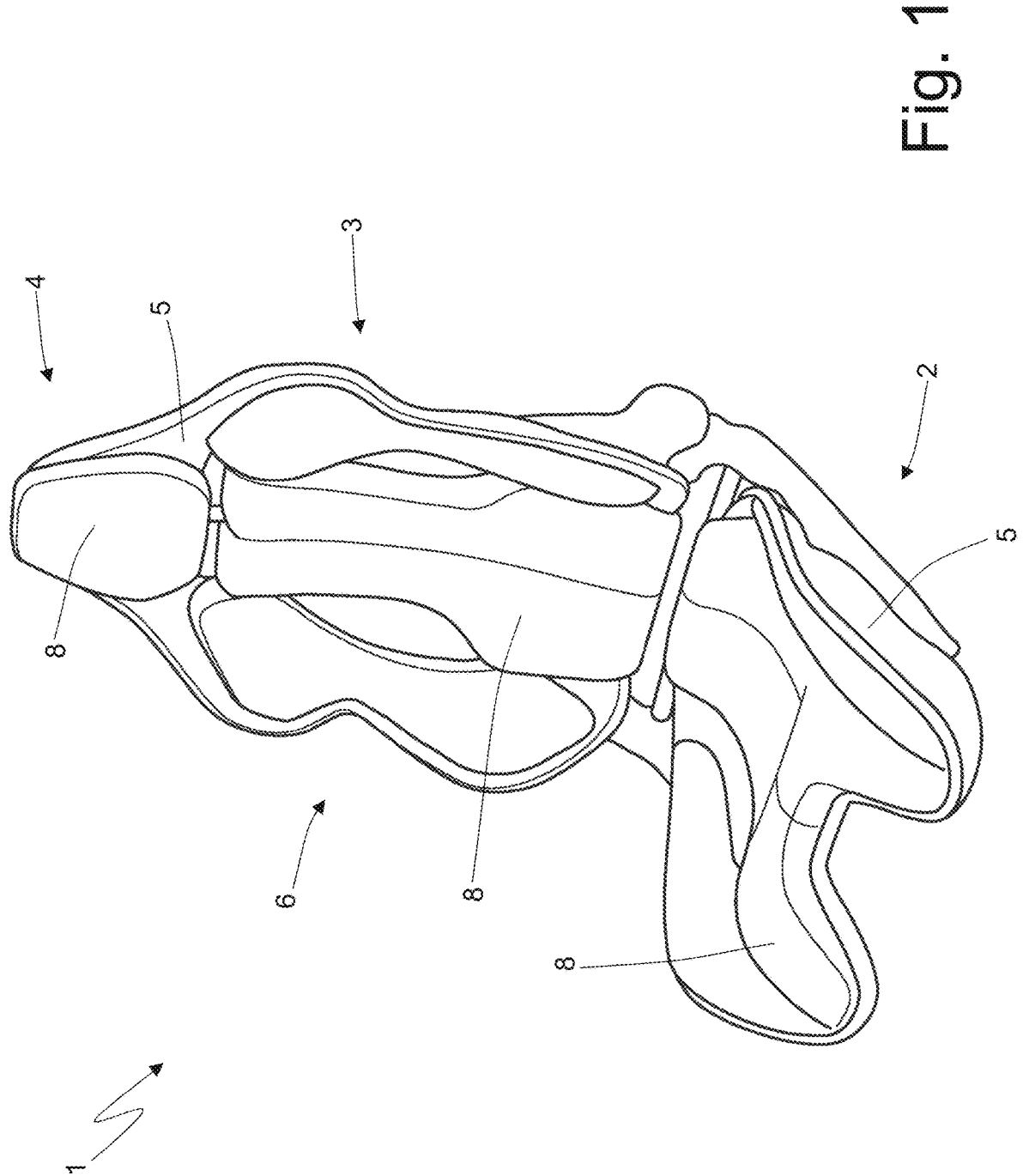
FIG. 1 is a perspective view of a vehicle seat produced in accordance with this invention.
Figures 2, 3:
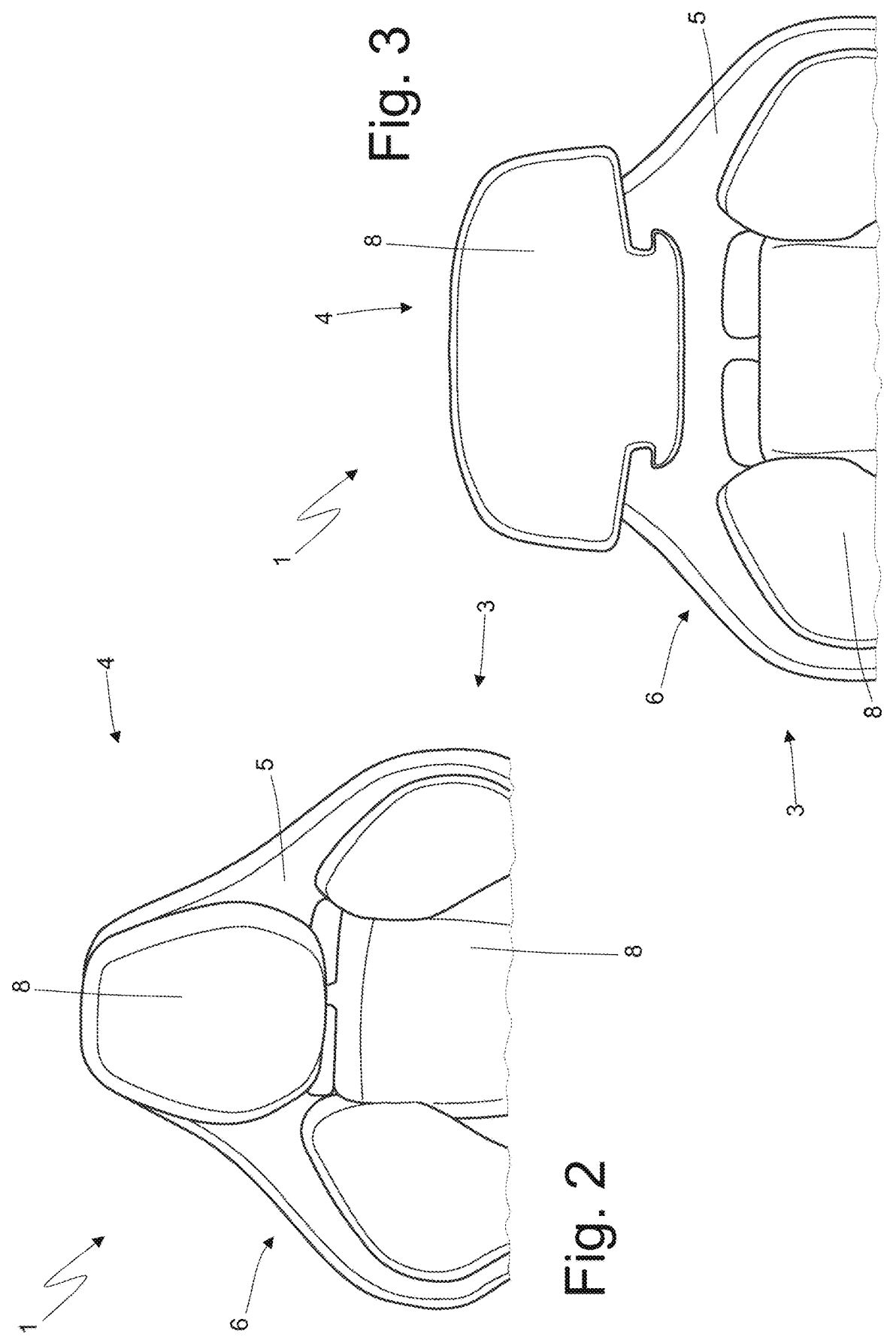
FIGS. 2 and 3 are two enlarged-scale views of an upper part of the seat in FIG. 1 with two different interchangeable headrests to be used alternatively.

In FIG. 1, reference number 1 indicates a seat of a vehicle as a whole.

The seat 1 is divided into a cushion 2 with an essentially horizontal configuration and a backrest 3 with an essentially vertical configuration; together, the cushion 2 and the backrest 3 give the seat 1 an "L" shape. Above the backrest 3 is a headrest 4, i.e. the backrest 3 ends at the top with the headrest 4.

In terms of construction, the seat 1 comprises a base structure 5 that is rigid (i.e. non-deformable due to the thrust of the body of the occupant sitting on the seat 1) and is configured to be fixed to a vehicle floorboard. Accordingly, the base structure 5 comprises the cushion 2, the backrest 3 and the headrest 4; i.e., the base structure 5 is divided into the cushion 2, the backrest 3 and the headrest 4.

In particular, at the backrest 3, the base structure 5 of the seat 1 has a front wall 6 (illustrated in FIG. 1) that faces the forward direction of the vehicle and a rear wall 7 (illustrated in FIG. 4) that is opposite the front wall 6 and faces the backward direction of the vehicle.

Furthermore, the seat 1 comprises an upholstery 8 that is elastically deformable (i.e. deformable due to the thrust of the body of the occupant sitting on the seat 1), is fixed above the base structure 5, at least partially covers the base structure 5 and constitutes the outermost part of the seat 1 that comes into contact with the body of the occupant in the seat 1, i.e. constitutes the aesthetic and tactile interface with the outside.

The upholstery 8 preferably comprises a cushion 2, a backrest 3 and a headrest 4 which are separate from and independent of one another; that is, the upholstery 8 is divided into the cushion 2, the backrest 3 and the headrest 4. In particular, the three components of the upholstery 8 (cushion 2, backrest 3, headrest 4) are spaced apart from each other and therefore there is a (small) gap between the three components of the upholstery 8.

The upholstery 8 comprises at least one replaceable component (the headrest 4 in the embodiment illustrated in the accompanying figures) that is attached to the base structure 5 in a separable manner by means of a coupling system 9 (schematically illustrated in FIG. 5) in order to be interchangeable.

Figures 4, 5:
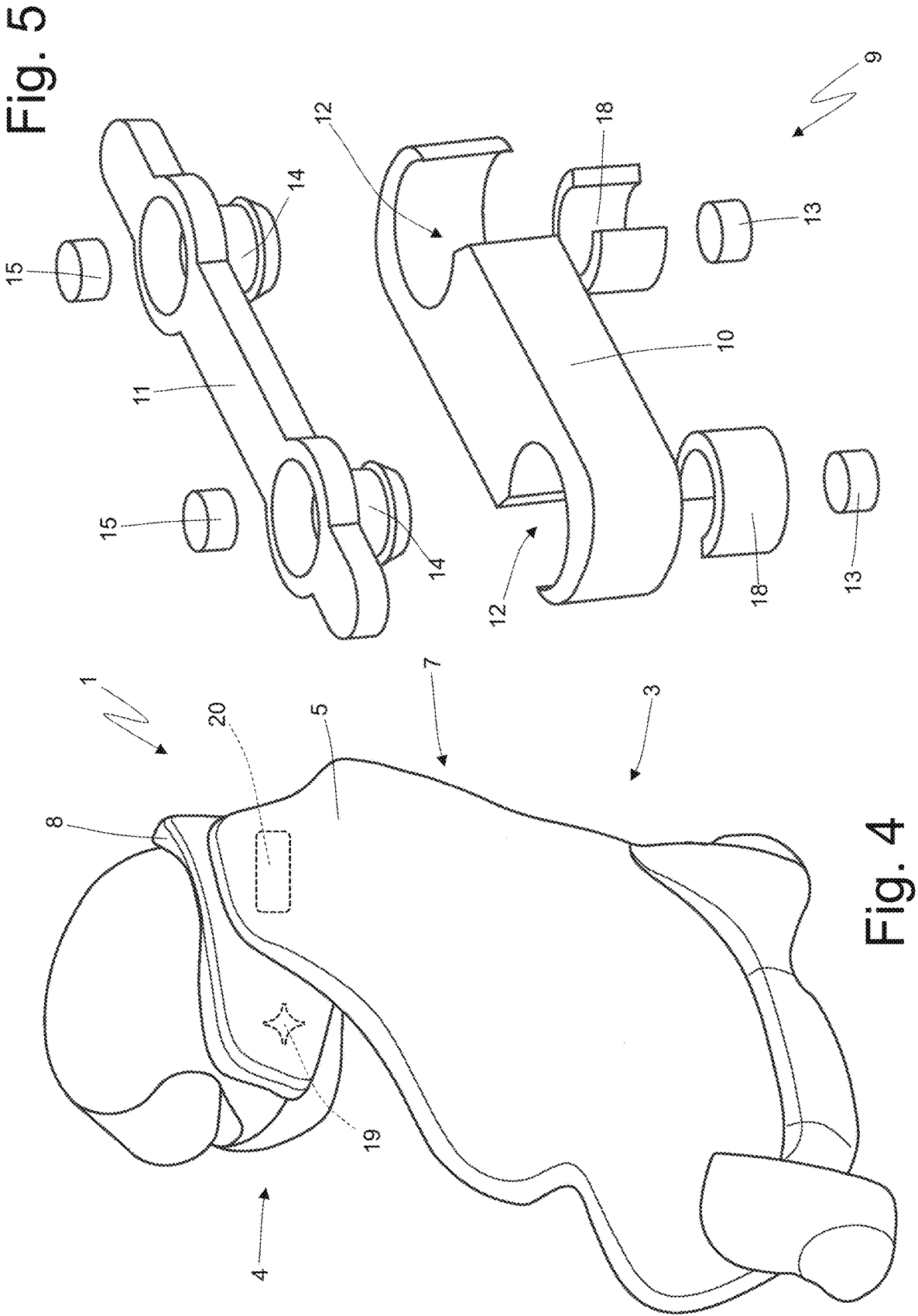
FIG. 4 is a perspective and rear view of part of the seat in FIG. 1 combined with the headrest in FIG. 3.
FIG. 5 is a perspective view with parts removed for clarity of a coupling system for coupling the headrest to a base structure of the seat in FIG. 1.

As illustrated in FIG. 5, the coupling system 9 comprises a fixing element 10 integral the base structure 5 and a fixing element 11 that is configured to couple to the fixing element 10 and is integral with the replaceable component (i.e. the headrest 4).

The fixing element 10 comprises two cavities 12 arranged next to each other and a pair of magnets 13, each of which is arranged near a corresponding cavity 12. The fixing element 11 comprises two appendages 14 that are arranged next to each other and each of which is shaped so as to be inserted in a corresponding cavity 12; in addition, the fixing element 11 comprises a pair of magnets 15, each of which is arranged near a corresponding appendage 14 and is configured to be magnetically attracted by a corresponding magnet 13. In the preferred embodiment illustrated in the attached figures, the coupling system 9 comprises two cavities 12 and two appendages 14, while according to a different embodiment not illustrated, the coupling system 9 comprises a single cavity 12 and a single appendage 14.

The two magnets 13 (coupled to the two cavities 12) have poles oriented in an opposite manner and, similarly, the two magnets 15 (coupled to the two appendages 14) have poles oriented in an opposite manner.

According to a possible embodiment, the fixing element 10 comprises a rotation hole 16 (illustrated in FIG. 6) and the other fixing element 11 comprises a pin 17 (illustrated in FIG. 7) that is positioned and shaped to fit into the rotation hole 16 when the two appendages 14 fit into the respective cavities 12 constituting a rotation constraint to rotate the fixing element 10 relative to the other fixing element 11 so as to separate one fixing element 10 from the other fixing element 11.

Each cavity 12 is U-shaped and has, transversely (laterally), an open end through which the corresponding appendage 14 can exit transversely (laterally) to decouple the two fixing elements 10 and 11 from each other.

According to a preferred embodiment, each appendage 14 is configured to be snapped into the corresponding cavity 12 by elastic deformation of part of the cavity 12.

According to a preferred embodiment, each appendage 14 has a shank ending in a head that protrudes radially outwards from the shank; that is, each appendage 14 has a "mushroom" shape in which the narrower shank is surmounted by the wider head.

According to a preferred embodiment, each cavity 12 contains a locking body 18 that is elastically deformable; preferably, the locking body 18 has a broken annular shape, i.e. it is a ring shaped like a "C", for being elastically deformed. Thus, the locking bodies 18 are elastically resilient and, in particular, are able to extend radially to allow the locking bodies 18 of the fixing element 11 to engage in the cavities 12 of the fixing element 10.

For the coupling system 9, the fixing element 10 is coupled to the fixing element 11 in such a way that the appendages 14 enter the cavities 12 by enlarging the locking bodies 18. The closing operation of the coupling system 9 is magnetically assisted by the magnets 13 and 15 that are arranged opposite each other so as to magnetically attract the appendages 14 inside the cavities 12; therefore, the closing operation of the coupling system 9 is essentially "automatic" simply by bringing the two fixing elements 10 and 11 together, i.e. by determining the start of the magnetic attraction between the magnets 12 and 14.

While the closure of the coupling system 9 is carried out by bringing the two fixing elements 10 and 11 together to insert (aided by the magnetic attraction of the magnets 13 and 15) the appendages 14 into the cavities 12, the coupling system 9 can be re-opened by rotating the fixing element 11, which is integral with the headrest 4, relative to the fixing element 10, which is integral with the base structure 5. When the fixing element 11 is rotated with respect to the fixing element 10, the appendages 14 are moved through the side openings of the locking bodies 18 and pass through the side openings of the cavities 12 (the positive engagement of the appendages 14 in the cavities 12 is thus eliminated and the fixing element 11 can be moved away from the fixing element 10).

Among other things, when the fixing elements 10 and 11 are positioned together, the pin 17 protruding from the fixing element 11 engages the rotation hole 16 formed in the fixing element 10; in this way, the fixing element 11 is mounted on the fixing element 10 so that it is only rotatable in the opening direction and thus the opening movement is guided, simplifying handling and preventing the fixing elements 10 and 11 from tilting relative to each other during opening.

It is important to note that when the coupling system 9 is opened with the above-mentioned rotary motion, the magnets 13 are shifted sideways relative to the magnets 15, so that the magnetic attraction between the magnets 13 and 15 is weakened and the fixing elements 10 and 11 can thus be removed from each other without excessive force.

In practice, the user always and only handles the headrest 4, i.e., to fix the headrest 4 to the base structure 5, the user grasps the headrest 4 with their hands and brings it closer to the base structure 5 trying to match the appendages 14 of the fixing element 10 with the cavities 12 of the fixing element 11; on the other hand, to remove the headrest 4 the user grasps the headrest 4 with their hands and rotates it (in the only direction in which it can be rotated).

In the embodiment illustrated in the attached figures, the fixing element 11 provided with the appendages 14 is integral with the headrest 8 while the fixing element 10 provided with the cavities 12 is integral with the base structure 5; according to an alternative embodiment not illustrated, the fixing element 11 provided with the appendages 14 is integral with the base structure 5 while the fixing element 10 provided with the cavities 12 is integral with the headrest 8.

Figures 6, 7:
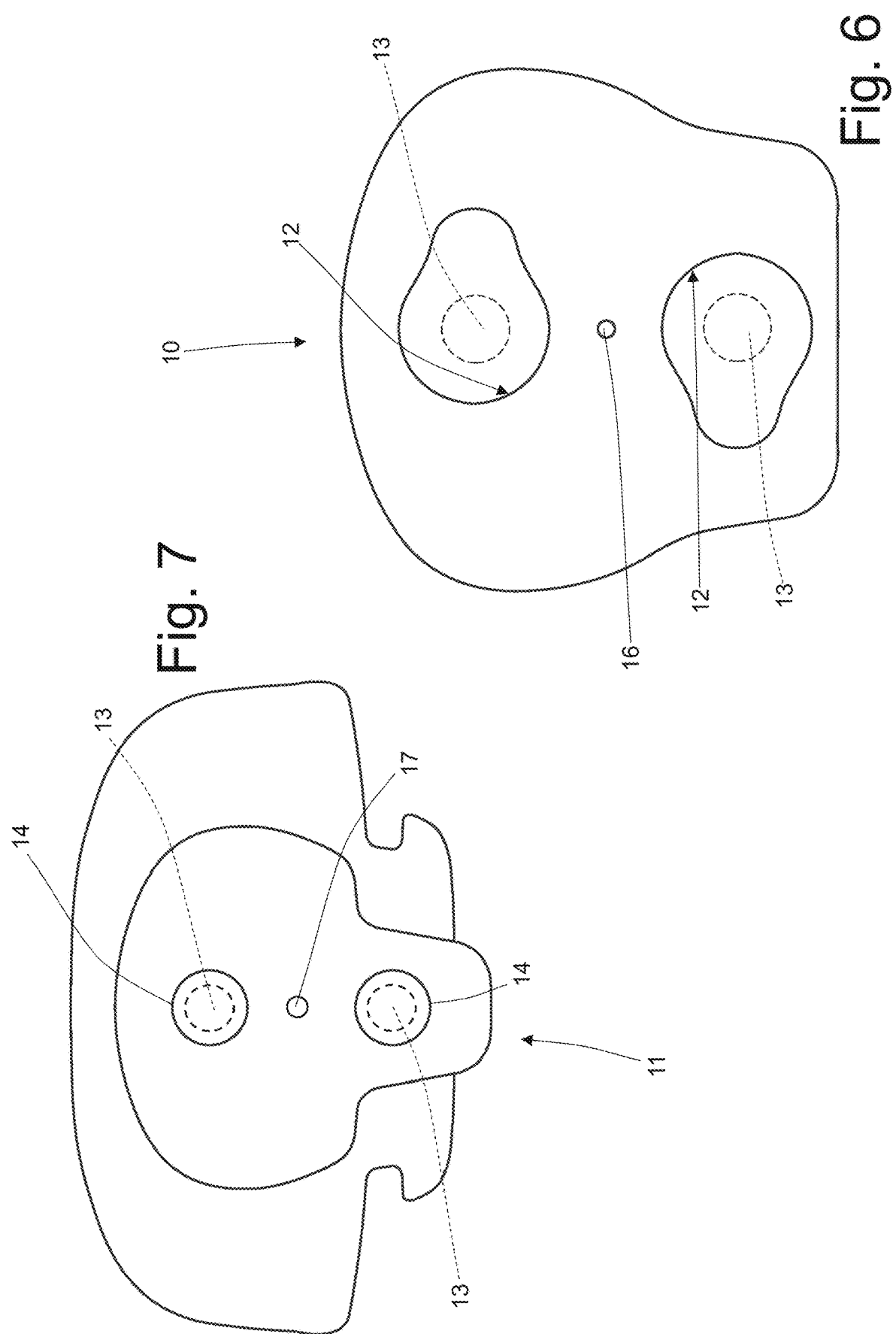
FIGS. 6 and 7 are two views of two fixing elements of the coupling system.
Figures 8, 9:
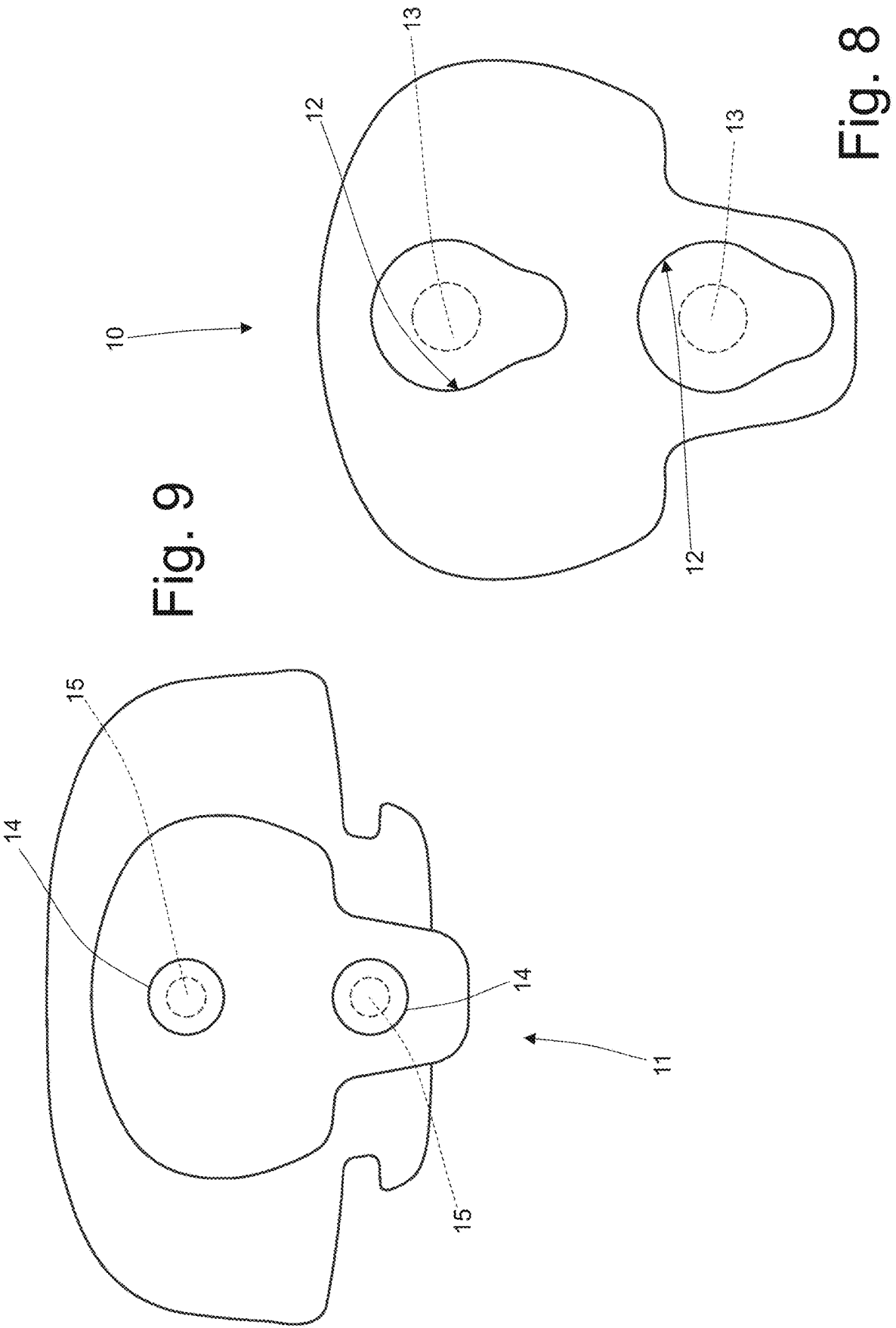
FIGS. 8 and 9 are two views of two fixing elements of a variant of the coupling system.

In the embodiment illustrated in FIGS. 6 and 7, the two cavities 12 of the fixing element 10 (integral with the base structure 5) have their lateral openings oriented in opposite directions in such a way that the opening movement of the coupling system 9 necessarily requires rotation in only one direction. In the embodiment illustrated in FIGS. 8 and 9, the two cavities 12 of the fixing element 10 (integral with the base structure 5) have their lateral openings oriented in the same direction upwards in such a way that the opening movement of the coupling system 9 necessarily requires translation upwards.

In the embodiment illustrated in the attached figures, the only replaceable component of the upholstery 8 is the headrest 4. According to an alternative embodiment, in addition to the headrest 4 (or instead of the headrest 4), the backrest 3 (or part of the backrest 3) is replaceable, the cushion 2 (or part of the cushion 2) is replaceable, or both the backrest 3 (or part of the backrest 3) and the cushion 2 (or part of the cushion 2) are replaceable. Generally, the entire headrest 4 is always replaceable, while for the cushion 2 and backrest 3, only parts, and preferably the sides arranged laterally, may be replaceable to decrease lateral support for more comfort (intended for quiet driving on public roads) or to increase lateral support (to reduce lateral shaking of the occupant on the seat 1 during performance driving on the track).

As illustrated in FIGS. 1-4, the seat 1 includes a first interchangeable headrest 4 (illustrated in FIGS. 1 and 2) that is suitable for driving on public roads, a second interchangeable headrest 4 (not illustrated in detail and featuring greater lateral support) that is suitable for sports driving, and a third interchangeable headrest 4 (illustrated in FIGS. 3 and 4) that is suitable for sports driving while wearing a helmet. The second headrest 4 is more rigid than the first headrest 4, and has longer sides than the first headrest 4 to provide greater lateral support. The third headrest 4 is thinner than the first headrest 4 and the second headrest 4 (to compensate for the thickness of the helmet), and has sides sized to accommodate the helmet between them without clearance (i.e. to laterally lock the helmet when the helmet is in contact with the headrest 4).

According to a possible embodiment schematically illustrated in FIG. 4, the seat 1 comprises a recognition system provided with an identifying device 19 that is integral with the replaceable component (i.e. the headrest 4) and contains an identification code and a reader device 20 that is mounted on the base structure 5 at the replaceable component and is configured to read the identifying device 19. As an example, the recognition system could use RFID technology and, therefore, the identifying device 19 could be a passive transponder. The reader device 20 is connected to a control unit that is configured to check for the presence of the replaceable component and to prevent the vehicle from starting in the absence of the replaceable component (i.e. if the headrest 4 is not present, for example, the vehicle cannot be started). Furthermore, the control unit could be configured to check that the replaceable component that is present on the seat 1 is consistent with the current mission of the vehicle (e.g. it would not make sense to mount a replaceable component suitable for track driving when a comfortable drive setting is required from the vehicle, and vice versa).

In other words, there is a detection system provided with the reader device 20 that is mounted on the base structure 5 at the replaceable component (i.e. the headrest 4) and is configured to check the presence of the replaceable component (i.e. the headrest 4).

Figure 10:
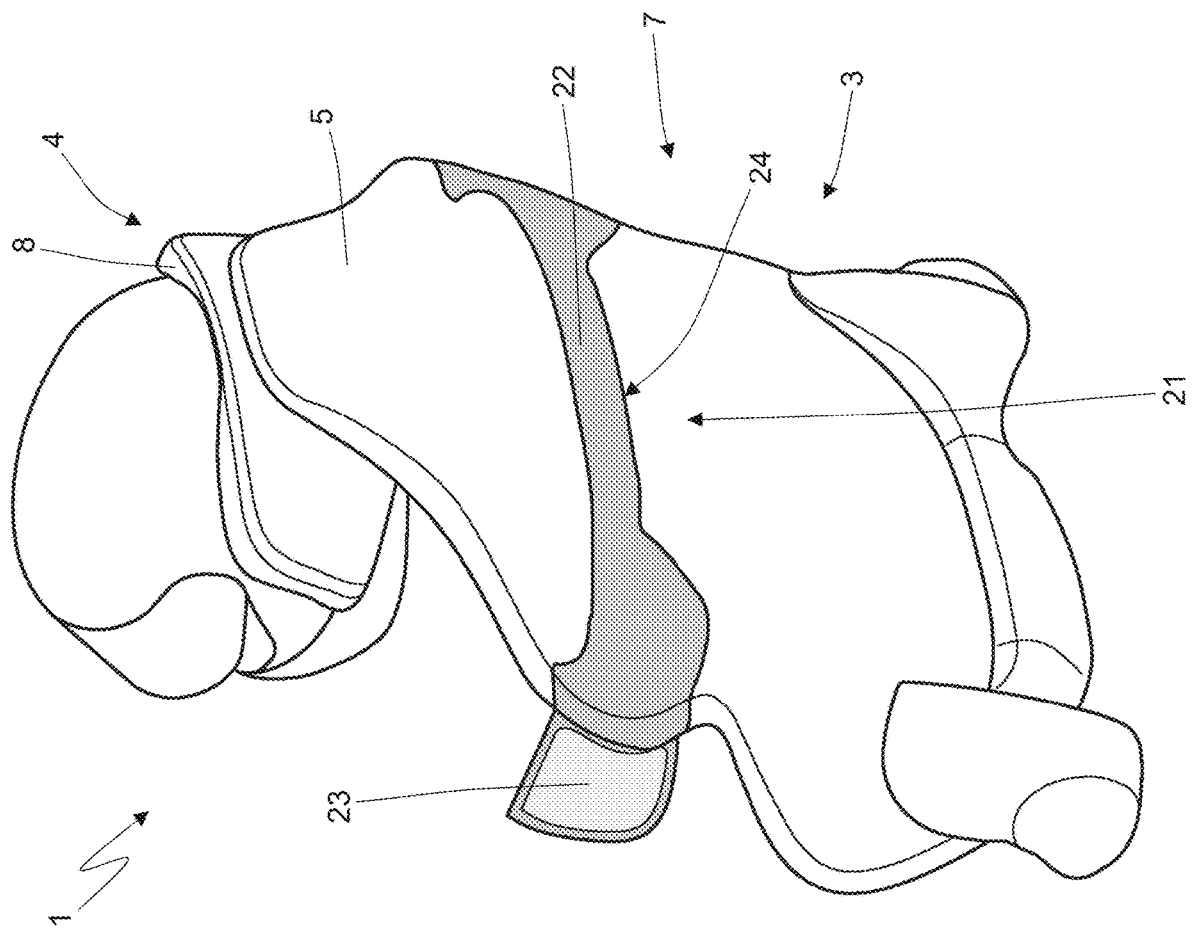
FIGS. 10, 11 and 12 are perspective and rear views of the seat in FIG. 1 coupled with three respective variants of a detachable restraining element.
Figure 11:
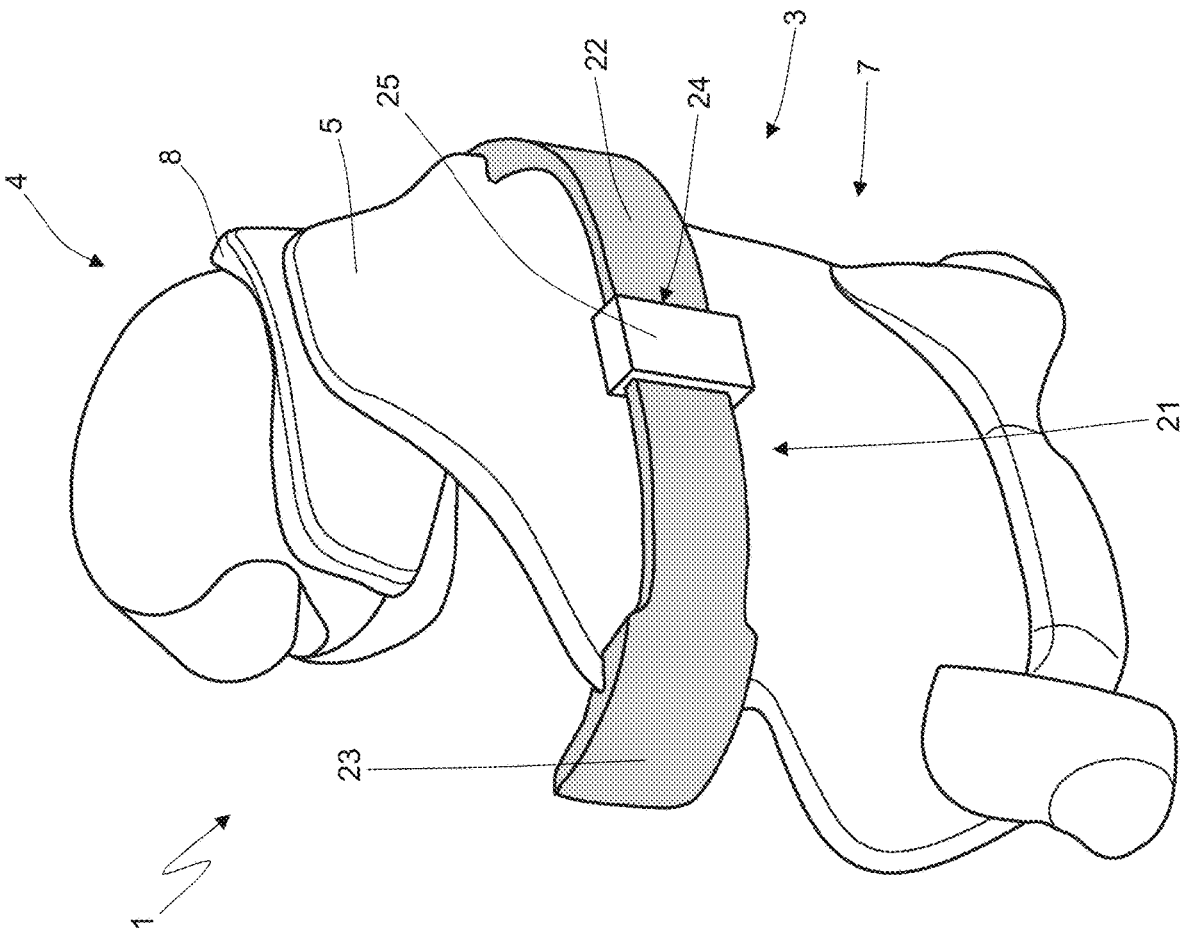
Figure 12:
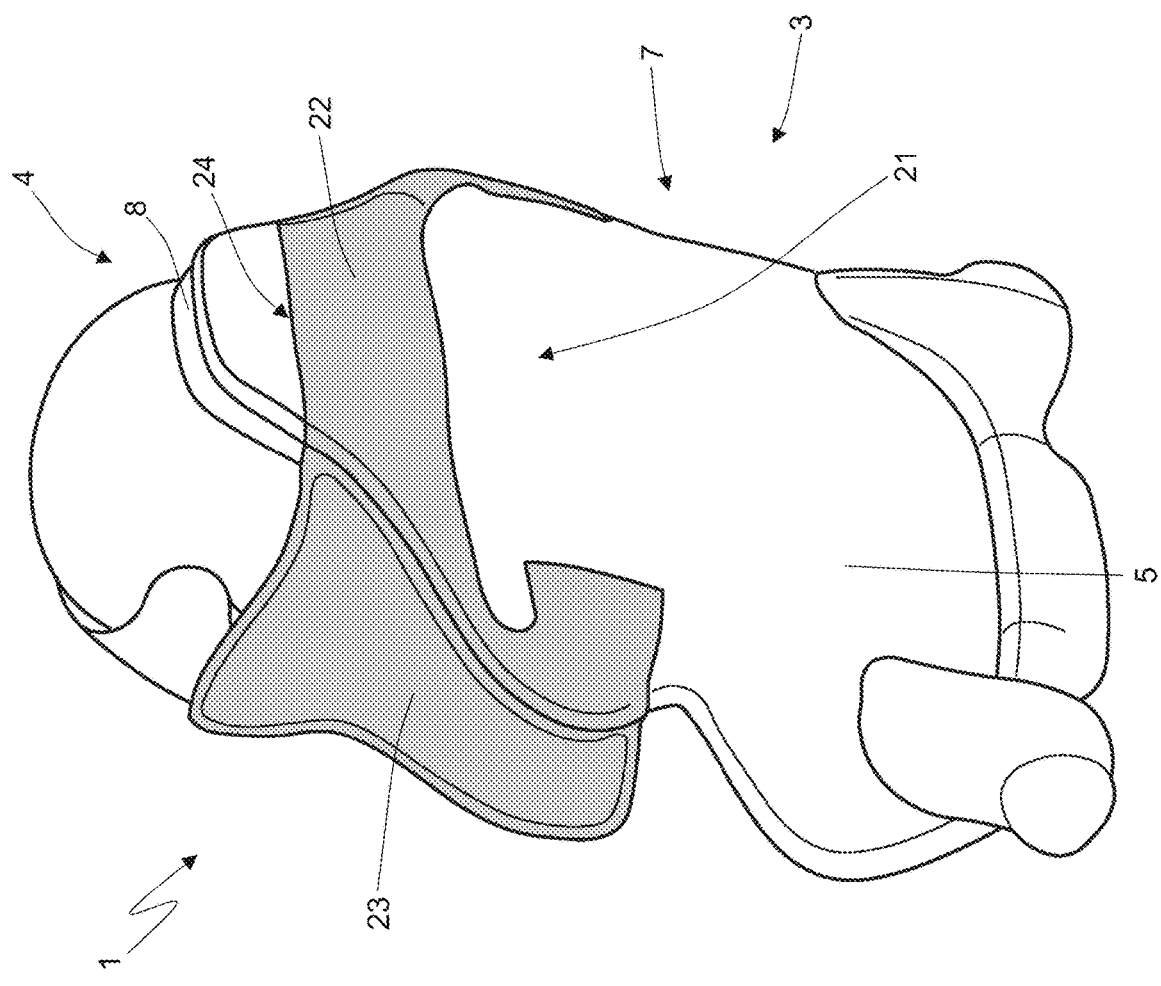

As illustrated in FIGS. 10, 11 and 12, the seat 1 includes a detachable restraining element 21 (i.e., which can be installed only when necessary and is not present in quiet driving on public roads, i.e., reserved only for performance driving on the racetrack) which is "C" shaped and is removably attached to the rear wall 7 of the base structure 5 at the backrest 3 to protrude on both sides from the base structure 5 increasing lateral support. The function of the restraint element 21 is to increase lateral support when necessary (i.e. only for performance driving on the track to reduce lateral shaking of the seat 1 occupant during performance driving on the track).

The restraint element 21 is preferably arranged at the height of the shoulders of the seat 1 occupant in such a way as to block lateral movements of the shoulders (i.e. in such a way as to laterally restrain the shoulders by preventing the shoulders from swinging transversely); in other words, in this position the restraining element 21 achieves its maximum effectiveness because by blocking lateral movements of the shoulders (i.e. by preventing the shoulders from swinging transversely) it is possible to keep the seat 1 occupant in the correct position preventing the seat 1 occupant from being subjected to annoying transverse shaking and, at the same time, allowing the arms of the seat 1 occupant to freely carry out all actions necessary for driving (obviously when the seat 1 occupant is the driver of the vehicle).

In particular, the restraint element 21 comprises a central portion 22 that is shaped to rest against the rear wall 7 of the base structure 5 (being stably and rigidly connected to the rear wall 7) and two lateral portions 23 that are arranged on opposite sides of the central portion 22 and protrude on both sides from the base structure 5 at the backrest 3. In the embodiments illustrated in FIGS. 10 and 11, the lateral portions 23 of the restraint element 21 are relatively small and are shaped to only come into contact with the shoulders of the occupant sitting on the seat 1. In the embodiment illustrated in FIG. 12, the side portions 23 of the restraint element 21 are relatively extended and are shaped so as to come into contact both with the shoulders of the occupant sitting on the seat 1 and the head of the occupant sitting on the seat 1; in the embodiment illustrated in FIG. 12, the side portions 23 of the restraint element 21 are shaped to accommodate a helmet worn by the occupant sitting on the seat 1, and according to another embodiment not illustrated the side portions 23 of the restraint element 21 are shaped to accommodate the head without a helmet of the occupant sitting on the seat 1.

Figure 13:
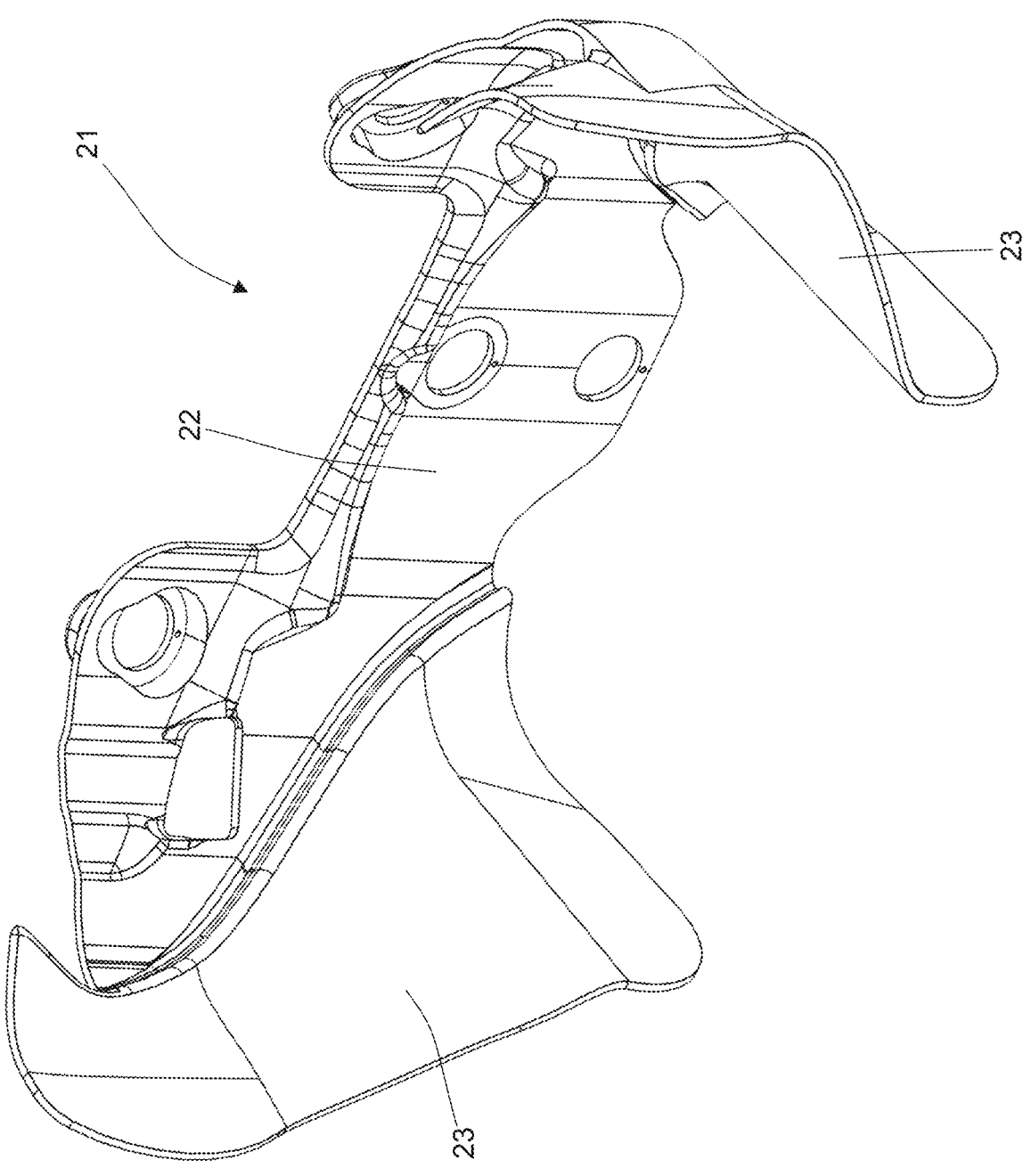
FIGS. 13 and 14 are two perspective views of two additional variants of a detachable restraining element.
Figure 14:
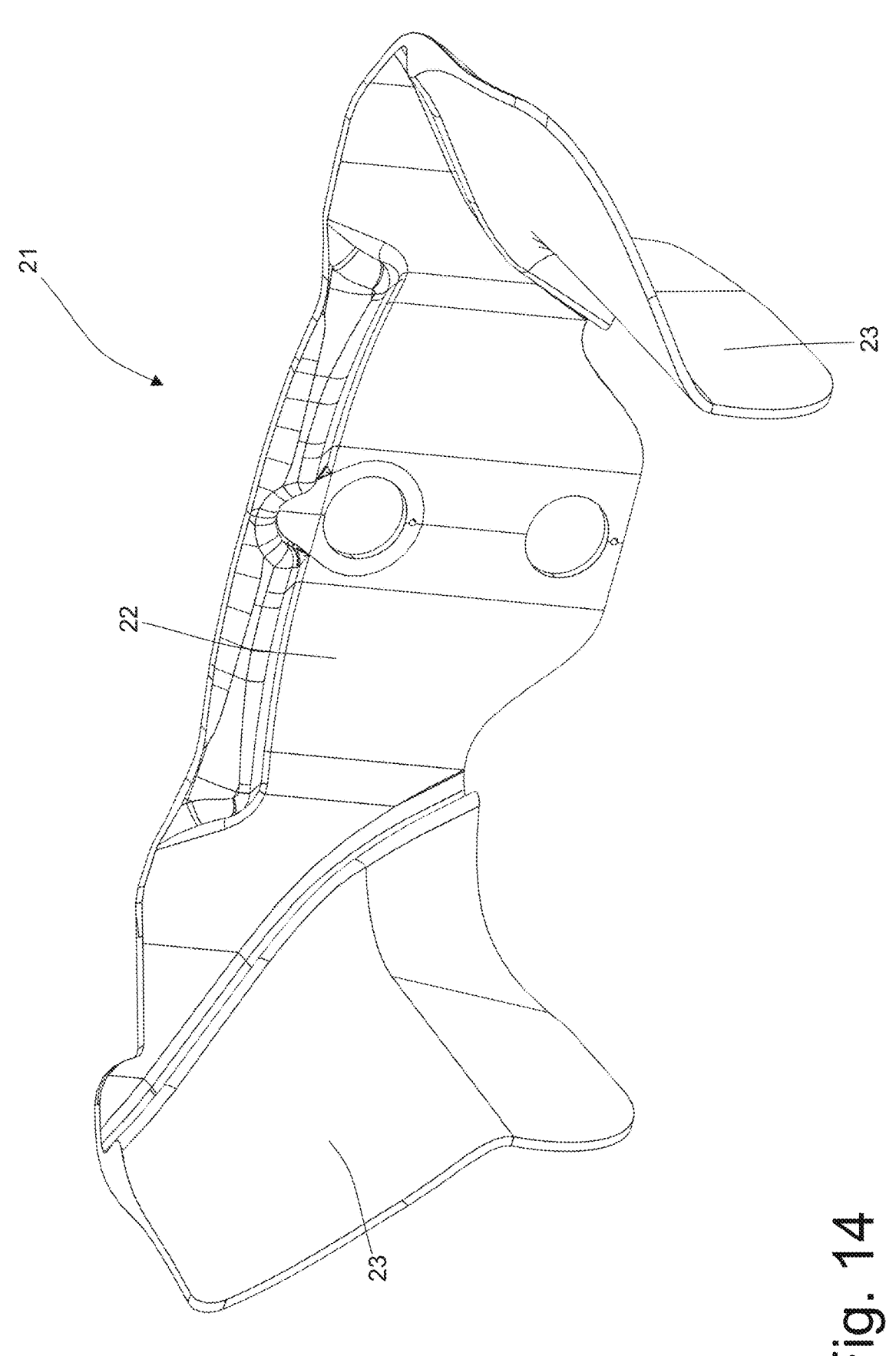

FIGS. 13 and 14 illustrate two additional embodiments of the detachable restraint element 21 shaped to accommodate a helmet worn by the occupant sitting on the seat 1. In other words, the embodiments of the restraint element 21 illustrated in FIGS. 12, 13 and 14 are suitable for use (i.e. fitted in the seat 1) when the occupant sitting in the seat 1 is wearing a helmet.

The restraint element 21 is preferably rigid (i.e. in use it does not deform appreciably under the thrust of the body of the occupant of the seat 1) and is provided with two pads that are elastically deformable (i.e. deformable under the thrust of the body of the occupant sitting on the seat 1) and are attached to the two side portions 23 of the restraint element 21.

The rear wall 7 of the base structure 5 has a seat 24 shaped to accommodate and restrain the central portion 22 of the detachable restraint element 21. In the embodiment illustrated in FIGS. 10 and 12, the restraint element 21 is composed of a single, indivisible piece; in this embodiment, the seat 24 is hollowed out in the rear wall 7 of the base structure 5 and is shaped to reproduce in negative the shape of part of the restraint element 21. In the embodiment illustrated in FIG. 11, the restraint element 21 comprises two separate pieces; in this embodiment, the rear wall 7 of the base structure 5 comprises a housing body 25 that protrudes cantilevered from the rear wall 7 of the base structure 5, forms the seat 24 that accommodates and restrains the central portion 22 of the restraint element 21 and has two cavities on the two opposite sides in which the central ends of the two pieces comprising the restraint element 21 can be inserted.

In the embodiments illustrated in FIGS. 1 to 14, the seat 1 is always provided with a headrest 4 that is part of the upholstery 8 and is detachably attached to the base structure 5 to be replaceable (interchangeable) so that a "standard" headrest 4 can be used during everyday driving and a "racing" headrest 4 (possibly shaped to accommodate a helmet worn by the occupant of the seat 1) during track driving. In the alternative embodiment illustrated in FIG. 15, the seat 1 includes a headrest 4 that is part of the upholstery 8 and is detachably attached to the base structure 5 not to be (only) replaceable (interchangeable), but to be simply removed during track driving with a helmet; indeed, in this embodiment, the base structure 5 comprises an upper portion that is configured to support the headrest 4 and, at the same time, is configured, in the absence of the headrest 4, to accommodate a helmet worn by the occupant sitting on the seat 1. In other words, without the headrest 4, the "naked" base structure 5 (i.e. directly in contact with the helmet without any interposing element) is shaped to accommodate the helmet (i.e. to provide some lateral support for the helmet).

In particular, the upper portion of the base structure 5 comprises a housing (seat) that is shaped to accommodate the helmet worn by the occupant sitting on the seat 1 and is accessible only when the headrest 4 is removed; that is, the headrest 4, when attached to the base structure 5, covers the housing hiding it from view.

Figure 15:
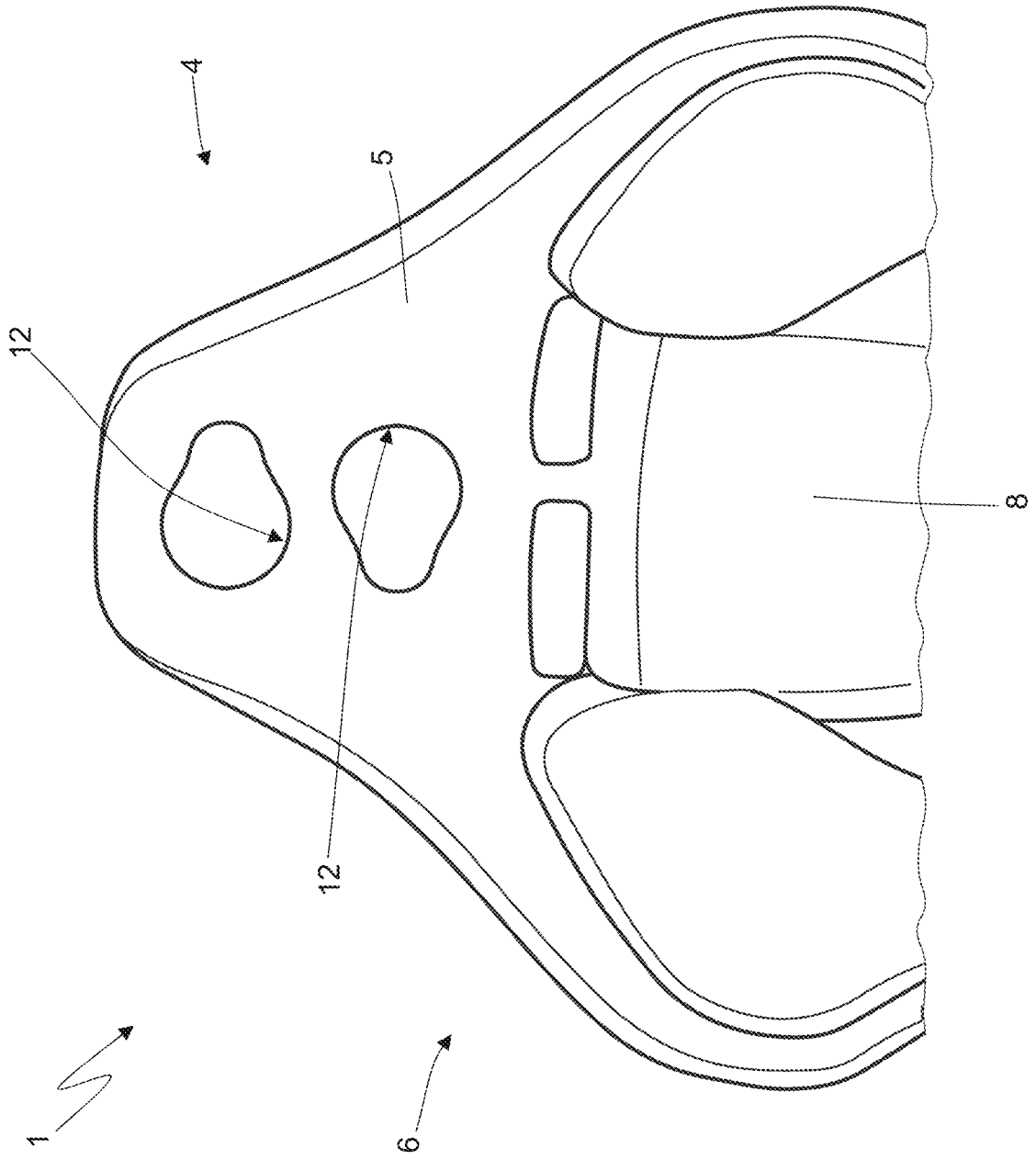
FIG. 15 is a view of an upper part of an additional embodiment of the seat in FIG. 1 without a headrest.

In other words, the embodiment illustrated in FIG. 15 involves mounting the headrest 4 to the base structure 5 when the occupant sitting on the seat 1 is not wearing a helmet and to remove the headrest 4 from the base structure 5 when the occupant sitting on the seat 1 is wearing a helmet.

In this regard, it is important to note that the "softness" is provided by the helmet's inner padding and that the outer shell of the helmet is rigid; therefore, there is no need for the base structure 5 to be soft in any way because it only comes into contact with the outer shell of the helmet and not with the head of the seat occupant.

It is important to note that the seat 1 may be a single seat arranged in a front or rear position (as illustrated in the attached figures) or it may be a double or triple seat arranged in a rear position; in this case, the seat 1 preferably comprises a single base structure 5 that accommodates two or three different upholsteries 3.

The embodiments described herein may be combined between them without departing from the scope of protection of this invention.

The seat 1 as described above has many advantages.

Firstly, the seat 1 as described above provides a lot of comfort for all occupants, i.e. all passengers using the seat 1, and in all driving conditions. This is achieved because a base structure 5 is used that is permanently fixed to the vehicle floorboard and is common to all passengers using the seat 1 and in all driving conditions (i.e. it always remains the same for all passengers using the seat 1 and in all driving conditions) and an upholstery 8 that is (easily and quickly) modifiable by replacing at least one replaceable component (e.g. the headrest 4). In particular, the replaceable component can be replaced to allow the same person to optimise the replaceable component for the mission (i.e. to have a more comfortable replaceable component for everyday driving and a more restraining replaceable component for performance driving on the track) or the replaceable component can be replaced to adapt the seat 1 to different people. In other words, the replaceable component can be customised both for each passenger using the seat 1 and for the driving conditions in which the vehicle will be used.

In addition, the above-described seat 1 also makes it possible to quickly change the appearance of the seats 1, thus allowing the vehicle owner to substantially change the appearance of the passenger compartment.

The seat 1 coupling system 9 described above allows for quick and easy (i.e. intuitive and ergonomic) assembly and disassembly of a replaceable component. At the same time, the seat 1 coupling system 9 described above ensures an extremely robust and stable connection of the replaceable upholstery 8 component to the base structure 5. Finally, the seat 1 coupling system 9 described above is particularly compact and light.

REFERENCE NUMBER LIST FOR FIGURES 1 seat
2 cushion 3 backrest
4 headrest
5 base structure
6 front wall
7 rear wall
8 upholstery
9 coupling system
10 fixing element
11 fixing element
12 cavity
13 magnet
14 appendage
15 magnet
16 rotation hole
18 locking body
19 identifying device
20 reader device
21 restraint element
22 central portion
23 side portions
24 seat
25 housing body

The invention claimed is:

1. A seat (1) of a vehicle comprising:
a base structure (5), which is rigid and is configured to be fixed to a floorboard of the vehicle; and
an upholstery (8), which is elastically deformable, at least partially covers the base structure (5) and constitutes the outermost part of the seat (1) that comes into contact with a body of a passenger of the seat (1);
wherein the upholstery (8) comprises a cushion (2), a backrest (3) and a headrest (4), which are separate from and independent of one another;
wherein the headrest (4) of the upholstery (8) is fixed to the base structure (5) in a separable manner by means of a coupling system (9);
wherein the base structure (5) comprises an upper portion, which is configured to support the headrest (4) and, at the same time, is configured, in the absence of the headrest (4), to accommodate a helmet worn by the passenger sitting on the seat (1);
wherein it is provided with a detection system comprising a reader device (20), which is mounted on the base structure (5) in the area of the headrest (4) and is configured to check for the presence of the headrest (4);
wherein the detection system comprises an identifying device (19), which is integral to the headrest (4) and contains an identification code; and
wherein the reader device (20) is configured to read the identifying device (19).

2. The seat (1) according to claim 1, wherein the upper portion of the base structure (5) comprises a housing that is conformed to accommodate the helmet worn by the passenger sitting on the seat (1) and is accessible only when the headrest (4) is removed.

3. The seat (1) according to claim 2, wherein the headrest (4), when attached to the base structure (5), covers the housing by concealing it from view.

4. The seat (1) according to claim 1 and comprising a coupling system (9) provided with a first fixing element (10) integral to the base structure (5) and a second fixing element (11), which is configured to be coupled to the first fixing element (10) and is integral to the headrest (4).

5. The seat (1) according to claim 3, wherein the first fixing element (10) comprises at least one cavity (12); and the second fixing element (11) comprises at least one appendage (14) configured to be inserted into the cavity (12).

6. The seat (1) according to claim 1, wherein the base structure (5) is configured to provide a given lateral support for the helmet.

7. The seat (1) according to claim 1, wherein the detection system uses RFID technology and the identifying device (19) is a transponder.

8. The seat (1) according to claim 1 and comprising a control unit configured to:

check the presence of the headrest (4);

detect the position of the vehicle in which the seat (1) is installed; and enable the starting of the vehicle wherein the seat (1) is installed in the absence of the headrest (4) only if the vehicle is on a track closed to normal vehicular traffic.

9. The seat (1) according to claim 8, wherein the control unit is configured to prevent the vehicle, in which the seat (1) is installed, from starting in the presence of the headrest (4) if the vehicle is on track closed to normal vehicular traffic.

10. A method to use a seat (1) according to claim 1 and comprising the steps of:

fitting the headrest (4) to the base structure (5) when the passenger sitting on the seat (1) does not wear a helmet; and removing the headrest (4) from the base structure (5) when the passenger sitting on the seat (1) wears a helmet.

11. The use method according to claim 10 and comprising the steps of:

checking the presence of the headrest (4);

detecting the position of the vehicle wherein the seat (1) is installed; and enabling the vehicle, in which the seat (1) is installed, to start in the absence of the headrest (4) only if the vehicle is on a track closed to normal vehicular traffic.

12. The use method according to claim 11 and comprising the step of preventing the vehicle, in which the seat (1) is installed, from starting in the presence of the headrest (4) if the vehicle is on a track closed to normal vehicular traffic.

13. A seat (1) of a vehicle comprising:

a base structure (5), which is rigid and is configured to be fixed to a floorboard of the vehicle; and an upholstery (8), which is elastically deformable, at least partially covers the base structure (5) and constitutes the outermost part of the seat (1) that comes into contact with a body of a passenger of the seat (1);

wherein the upholstery (8) comprises a cushion (2), a backrest (3) and a headrest (4), which are separate from and independent of one another;

wherein the headrest (4) of the upholstery (8) is fixed to the base structure (5) in a separable manner by means of a coupling system (9);

wherein the base structure (5) comprises an upper portion, which is configured to support the headrest (4) and, at the same time, is configured, in the absence of the headrest (4), to accommodate a helmet worn by the passenger sitting on the seat (1);

wherein it is provided with a detection system comprising a reader device (20), which is mounted on the base structure (5) in the area of the headrest (4) and is configured to check for the presence of the headrest (4); and wherein it is provided with a control unit configured to: check the presence of the headrest (4); detect the position of the vehicle wherein the seat (1) is installed; and enable the starting of the vehicle, in which the seat (1) is installed, in the absence of the headrest (4) only if the vehicle is on a track closed to normal vehicular traffic.

14. The seat (1) according to claim 13, wherein the control unit is configured to prevent the vehicle, in which the seat (1) is installed, from starting in the presence of the headrest (4) if the vehicle is on track closed to normal vehicular traffic.

15. The seat (1) according to claim 13, wherein the upper portion of the base structure (5) comprises a housing that is conformed to accommodate the helmet worn by the passenger sitting on the seat (1) and is accessible only when the headrest (4) is removed.

16. The seat (1) according to claim 15, wherein the headrest (4), when attached to the base structure (5), covers the housing by concealing it from view.

17. The seat (1) according to claim 13, wherein the base structure (5) is configured to provide a given lateral support for the helmet.

18. A method to use a seat (1) of a vehicle; the seat (1) comprising:

a base structure (5), which is rigid and is configured to be fixed to a floorboard of the vehicle; and an upholstery (8), which is elastically deformable, at least partially covers the base structure (5) and constitutes the outermost part of the seat (1) that comes into contact with a body of a passenger of the seat (1);

wherein the upholstery (8) comprises a cushion (2), a backrest (3) and a headrest (4), which are separate from and independent of one another;

wherein the headrest (4) of the upholstery (8) is fixed to the base structure (5) in a separable manner by means of a coupling system (9);

wherein the base structure (5) comprises an upper portion, which is configured to support the headrest (4) and, at the same time, is configured, in the absence of the headrest (4), to accommodate a helmet worn by the passenger sitting on the seat (1);

wherein it is provided with a detection system comprising a reader device (20), which is mounted on the base structure (5) in the area of the headrest (4) and is configured to check for the presence of the headrest (4); and wherein the use method comprises the steps of: fitting the headrest (4) to the base structure (5) when the passenger sitting on the seat (1) does not wear a helmet; and removing the headrest (4) from the base structure (5) when the passenger sitting on the seat (1) wears a helmet.

19. The use method according to claim 18 and comprising the steps of:

checking the presence of the headrest (4);

detecting the position of the vehicle wherein the seat (1) is installed; and enabling the vehicle, in which the seat (1) is installed, to start in the absence of the headrest (4) only if the vehicle is on a track closed to normal vehicular traffic.

20. The use method according to claim 19 and comprising the step of preventing the vehicle, in which the seat (1) is installed, from starting in the presence of the headrest (4) if the vehicle is on a track closed to normal vehicular traffic.

* * * * *